United States Patent [19]
McBeth

[11] Patent Number: 4,669,494
[45] Date of Patent: Jun. 2, 1987

[54] HYDRAULIC LOCK VALVE WITH PARTIAL RETURN TO TANK FOR MARINE STEERING

[75] Inventor: James McBeth, N. Vancouver, Canada

[73] Assignee: Teleflex Incorporated, Limerick, Pa.

[21] Appl. No.: 895,908

[22] Filed: Aug. 13, 1986

[51] Int. Cl.[4] ............ F16K 11/18
[52] U.S. Cl. ............ 137/106; 91/420
[58] Field of Search ............ 137/87, 106; 91/420

[56] References Cited

U.S. PATENT DOCUMENTS 3,933,167 1/1976 Byers ............ 137/106
4,551,973 11/1985 Broadhead ............ 91/420 X

*Primary Examiner*—Robert G. Nilson
*Attorney, Agent, or Firm*—Reising, Ethington, Barnard, Perry & Milton

[57] ABSTRACT

A hydraulic lock valve assembly (10) includes a valve body (16) having an axially extending main bore (18) and first and second axially spaced pump ports (20, 22). A tank passage (23) is in communication with said main bore (18) and first and second valve chambers (24, 26). The assembly (10) includes a spool valve (74) for opening either of the first and second check valve (36, 38) to allow fluid flow from the cylinder ports (28, 30) through the check valve (36, 38) and the inner passage (32, 34) to the pump ports (20, 22) to define a first return flow passage and for opening either of the first and second return ports (84, 86) to allow fluid flow to and from the tank passage (23) to and from the pump port (20, 22) through the return port (84, 86) to define a second return flow passage, whereby the spool valve (74) opens either of the first and second check valves (36, 38) in response to a predetermined delivery pressure in the delivery flow passage in opposite check valve chamber. The check valve (36, 38) includes an outer poppet (40, 56) and an inner popper (42, 58) slidably disposed within the outer popper (40, 56) to delay return flow through the first return flow passage to allow the spool valve (74) to open the second return flow passage prior to the inner poppet (42, 58) opening a restricted flow passage via orifices (54, 72) but before opening a large area passage via ports (41, 47) by outer poppets (40, 56).

13 Claims, 1 Drawing Figure

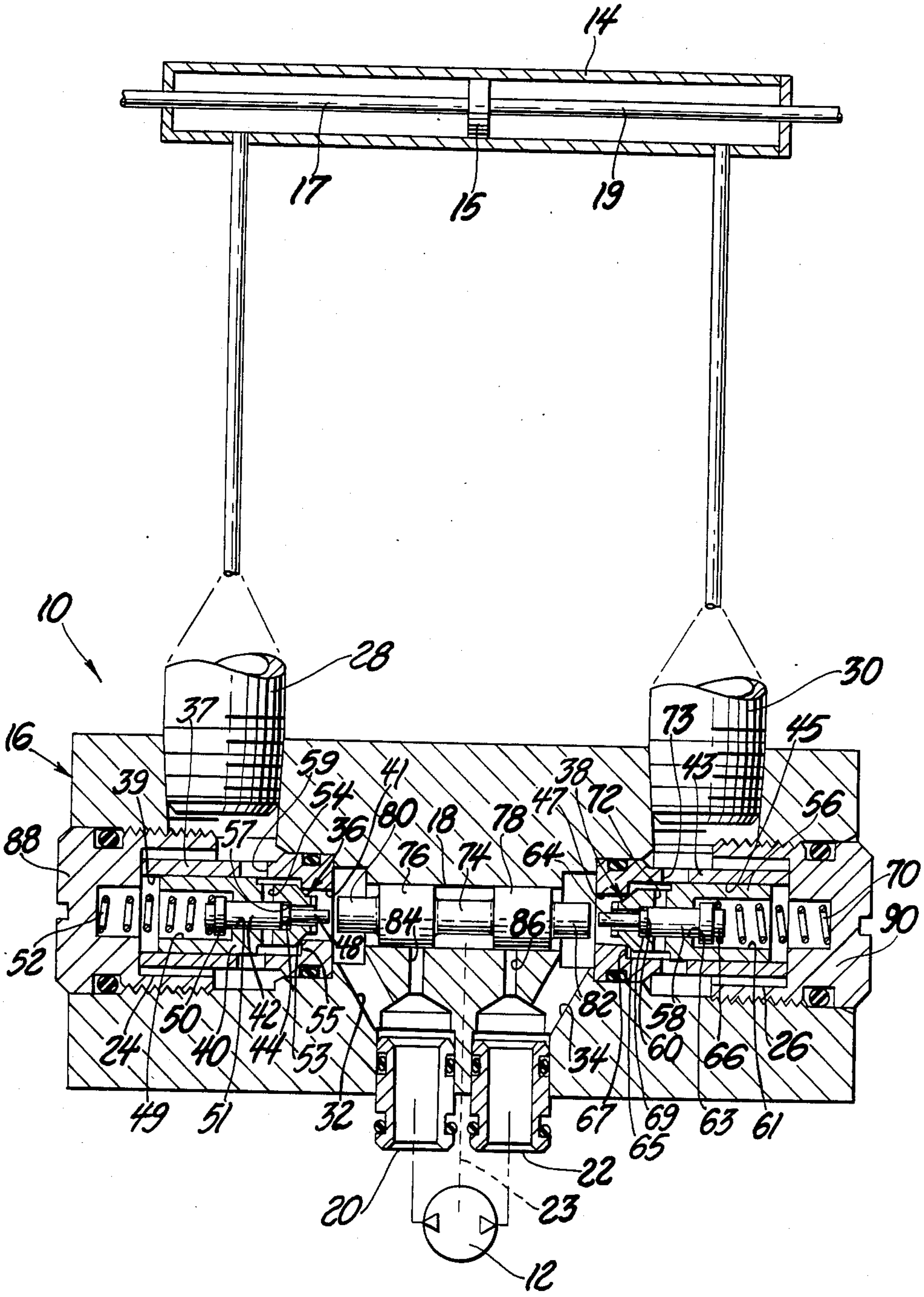
14
17
15
19
10
28
30
16
37
73
45
43
59
54
41
80
18
78
38
47
72
56
39
57
36
76
74
64
88
70
52
84
86
90
48
50
42
55
82
58
24
40
44
53
34
60
66
26
49
51
32
67
69
65
63
61
22
20
23
12

HYDRAULIC LOCK VALVE WITH PARTIAL RETURN TO TANK FOR MARINE STEERING

TECHNICAL FIELD

The subject invention relates to hydraulic lock valves and, particularly, hydraulic lock valves utilized in manual marine steering systems.

BACKGROUND ART

Typically, a marine steering system includes a steering or helm pump attached to a steering wheel for direction fluid to opposite ends of an actuating cylinder which, in turn, actuates the rudder to effect steering of the boat. These systems are typically closed circuit hydraulic systems.

In closed circuit hydraulic systems, several problems may occur. One is that air is difficult to remove from the oil. Secondly, supercharging may occur due to trapped pressure in the circuit. Further, actuators with unbalanced oil volumes on the supply and return sides, such as a hydraulic cylinder with an output rod at only one end, cannot be used.

The partial return to tank features overcomes these problems. The bleeding of air is aided since air separates from the oil in the portion of the flow return to the tank. By opening the return line to tank each time oil is pumped through the valve, any residual pressure in the system is released. Also, unbalanced actuators can be used since the volume differential is made up or bleed off through the tank port.

Several partial return to tank valves exist in the market today. However, several problems exist in these valves. One such problem is that valves of this type are costly to produce due to the very tight machining tolerances required.

One critical area is lap in the tank port area. Lap in a spool valve is the amount by which the port is opened or closed while the spool is in the center or off position. If the spool completely closes off the tank port, it is overlapped. If the port is slightly opened, it is underlapped. A valve where the spool closes off the port exactly so that the edge of the spool is in line with the edge of the port is called zero lapped.

In a marine steering type partial return to tank valve, the lap on the tank port must be closely controlled. When the spool is touching either check valve, i.e., ready to lift it, it requires an overlap on the pressure side to minimize leakage. The larger the overlap, the lower the leakage and thus less lost motion. On the return side, however, the optimum is zero lapped. If the spool is underlapped in this position, it is actually opening a bypass to tank. Should the pump be reversed, it could cause loss of steering. An overlapped spool allows the return check to open before the tank port is exposed. This results in the system remaining supercharged, although oil is flowing. The operator will sense hard steering until the wheel is surged enough to open the tank port.

A zero lap is, however, very expensive to produce since normal tolerance buildups in the various valve parts will not allow it. As a result, all parts must be match-fitted.

As will be appreciated, a dual operated lock valve prevents motion of the actuator whenever hydraulic pressure is not being supplied to the system while allowing a small flow of oil to or from the reservoir "tank" while it is open. By locking the actuator, rudder drift is prevented. However, when a full size single poppet is opened in an overrunning load condition, the sudden release of pressure causes delivery side pressure to drop and allowing the check to shut again. This process repeats continually as long as flow is being delivered which causes a distinct chatter.

One solution to eliminating chatter is by installing an orifice in the delivery line to hold the pressure on the delivery side of the spool high enough to hold the return check open. Although this is common practice in industrial hydraulics, as shown in U.S. Pat. No. 4,192,338 in the name of Benedict R. Gerulis, it has two significant drawbacks in marine steering. First, the orifice produces a high pressure to hold the spool open, but this also means high steering effort. Secondly, the return check is held fully open which allows the load to run away. Thus, the operator has little control of the amount of motion of the overrunning load since it no longer relates to wheel movement.

Another solution used in industrial hydraulics to eliminate chatter is a dual poppet system where only the smaller poppet is opened on the return side. This system overcomes the load problem, but still suffers from constant high steering loads due to the high pressure drop. Hence, both of the above-mentioned solutions reduce chatter but require a constant high effort in marine steering.

STATEMENT OF THE INVENTION AND ADVANTAGES

A hydraulic lock valve assembly of the type used in hydraulic marine steering systems includes a valve body having an axially extending main bore and first and second axially spaced pump ports in fluid communication with the main bore. A tank passage is in communcation with the main bore and first and second valve chambers are disposed at opposite ends of the main bore. A first cylinder port is in fluid communication with the first valve chamber and a second cylinder port is in fluid communication with the second valve chamber. A first inner passage extends between the first pump port and the first valve chamber and a second inner passage extends between the second pump port and the second valve chamber. First and second check valve means are located in the first and second valve chambers respectively. The first check valve means opens in response to a predetermined pressure in the first pump port for allowing fluid flow out through the first cylinder port to define a first delivery flow passage and the second check valve means opens in response to a predetermined pressure in the second pump port for allowing fluid flow out through the second cylinder port to define a second delivery flow passage. A first return port interconnects the first pump port and the main bore and a second return port interconnects the second pump port and the main bore. The assembly is characterized by a spool valve means slidably disposed in the main bore for opening either of the first and second check valve means to allow fluid flow from the first and second cylinder ports through the first and second check valve means and the first and second inner passages to the first and second pump ports to define a first return flow passage and for opening either of the first and second return ports to allow fluid flow to and from the tank passage to and from the first and second pump ports through the first and second return ports to define a second return flow passage whereby the spool valve means opens either of the first and second check valve means in response to a predetermined delivery pressure in the delivery flow passage in the opposite check valve chamber. Further, the check valve means includes an outer poppet and an inner poppet slidably disposed within the outer poppet to delay return flow through the first return flow passage to allow the spool valve means to open the second return flow passage prior to the inner poppet opening the first return flow passage.

Accordingly, the subject invention is less costly since the tolerance problems associated with the control of the laps are reduced through the use of the double poppet check valve arrangement. The inner poppet has a dual function which reduces the longitudinal tolerances. First, the inner poppet releases pressure from behind the large poppet. Once the pressure is reduced to approximately the level of the delivery side, the spool will open the larger poppet. Secondly, the inner poppet acts as an overlapped spool valve. The overlap on the inner poppet results in both the return spring and system pressure being used to recenter the main spool past where it normally would stop when returned by a conventional check. This additional movement is used to create an overlap on the tank port. Hence, the absolute values of the laps are not critical as in conventional designs. Only the tank port overlap needs to be smaller than the inner poppet lap so that the passage to the tank is open before the inner poppet opens the return port. Further, both safety and performance problems are overcome since the main spool in its neutral position always has a healthy overlap on the tank port.

In operation, as the return passage is opened, the tank port is already opened, i.e., underlapped, for optimum system pressure bleed down. Since the absolute dimensions of the laps are not critical, the components can be toleranced normally and the tolerance buildups accounted for in the overall relative sizes of the laps. Thus, a significant cost saving results in over match-fitted type parts.

Further, the use of the double check produces several other advantages. The subject invention significantly reduces the chatter. The small inner poppet must reduce return line pressure to approximately the same level as the delivery pressure before the main poppet can be opened. The exact pressure ratio can be adjusted via the main poppet seat diameter. In an overrunning load condition, return line pressure will generally be higher than delivery pressure. As long as this condition exists, i.e., the load is overrunning, the small poppet will throttle the return flow. This throttling eliminates chatter and prevents the load from running away so that the operator maintains control. The main poppet will only open once the overrunning load condition ceases, such as a rudder returning to center, or if the operator surges the wheel in an emergency maneuver. The ability to open the main poppet in an emergency maneuver is an additional safety feature over systems that simply rely on a small return flow to combat chatter. Hence, chatter is significantly reduced by being delayed until the high flow end of the steering range.

FIGURES IN THE DRAWINGS

Other advantages of the present invention will be readily appreciated as the same becomes better understood by reference to the following detailed description when considered in connection with the accompanying drawings wherein:

FIG. 1 is a schematic cross-sectional view showing the hydraulic lock valve assembly in detail.

DESCRIPTION OF THE PREFERRED EMBODIMENT

A hydraulic lock valve assembly is generally shown at 10 in FIG. 1. The hydraulic lock valve assembly 10 is of the type used in closed hydraulic marine steering systems having a helm steering pump 12 and a rudder cylinder 14. The cylinder 14 supports a piston 15 having two rods 17, 19 extending through the opposite ends of the cylinder 14.

The assembly 10 includes a valve body, generally indicated at 16, having an axially extending main bore 18. Axially spaced pump ports 20 and 22 provide fluid commmunication between the main bore 18 and the helm pump 12. A tank passage 23 is also in fluid communication with the main bore 18. A first valve chamber 24 and a second valve chamber 26 are disposed at opposite ends of the main bore 18. A first cylinder port 28 is in fluid communication with the first valve chamber 24. Similarly, a second cylinder port 30 is in fluid communication with the second valve chamber 36. In other words, the cylinder ports 28, 30 extend from the valve body 16 and are connected to the rudder cylinder 14. Hence, the fluid enters and exits the rudder cylinder 14 via the cylinder ports 28, 30.

The valve body 16 further includes a first inner passage 32 which provides fluid communication between the first valve chamber 24 and the first pump port 20. A second inner passage 34 provides fluid communication between the second valve chamber 26 and the second pump port 22. Said another way, the first inner passage 32 extends between the first pump port 20 and the first valve chamber 24 and a second inner passage 34 extends between the second pump port 22 and the second valve chamber 26. The valve body 16 further includes a first return port 84 interconnecting the first pump port 20 and the main bore 18 and a second return port 86 interconnecting the second pump port 22 and the main bore 18. In other words, the first return port 84 is in fluid communication with the first pump port 20 and the main bore 18, and the second return port 86 is also in fluid communication with the second pump port 22 and the main bore 18.

The assembly 10 includes a first check valve means, generally indicated at 36, disposed or housed in the first valve chamber 24 for opening in response to a predetermined pressure in the first pump port 20 for allowing fluid flow out through the first cylinder port 28 to define a first delivery flow passage. A second check valve means, generally indicated at 38, is disposed or housed in the second valve chamber 26 for opening in response to a predetermined pressure in the second pump port 22 for allowing fluid flow out through the second cylinder port 30 to define a second delivery flow passage. In other words, oil is pumped into the first pump port 20 and through the first check valve means 36 and exiting from the first cylinder port 28 to one side of rudder cylinder 14 which results in return oil flow from the other side of the rudder cylinder 14 to the opposite side of the valve body 16 through the second cylinder port 30 and through the second check valve means 38 and exiting the second pump port 22, and vice versa. Hence, oil pumped through the first pump port 20 will establish a first delivery flow passage with a return flow passage through the second pump port 22, and if the oil is pumped through the second pump port 22 then a second delivery flow passage will result with a return flow passage through the first pump port 20. Thus, the first and second check valve means 36, 38 controls the fluid flow from the helm pump 12 to the opposite sides of the rudder cylinder 14.

The first check valve means 36 includes a first valve sleeve 37 disposed or housed within the first valve chamber 24 and having a cavity portion 39 with a cylindrical shape. The first valve sleeve 37 includes an aperture 41 extending or diametrically communicating from the cavity portion 39 to the main bore 18. The aperture 41 is of a diameter less than the cavity portion 39. Similarly, the second check valve means 38 includes a second valve sleeve 43 disposed or housed within the second valve chamber 26 and having a cavity portion 45 with a cylindrical shape. The second valve sleeve 43 includes an aperture 47 extending or diametrically communicating from the cavity portion 45 to the main bore 18.

The first check valve means 36 further includes a first outer poppet 40 disposed or housed within the cavity portion 39 of the first valve sleeve 37. The first outer poppet 40 includes a cylindrical shaped female portion 49 and an aperture 51 extending or diametrically communciating from the female portion 49 to the aperture 41 of the first valve sleeve 37. The aperture 51 is of a reduced diameter than the female portion 49. The first outer poppet 40 includes an outer frustoconical portion 53 which abuts a shoulder or seat 55 on the first valve sleeve 37 for a first cylinder port return pressure closed position. The check valve means 36 also includes a first inner poppet 42 slidably disposed in the aperture 51 of the first outer poppet 40. The first inner poppet 42 has a first shoulder 42 engaging an inner seat 57 in the first outer poppet 40 in the first cylinder port return pressure closed position.

The first inner poppet 42 includes a first pin 48 extending into the main bore 18 from the first shoulder 44 and a spring keeper 50 on the oppositely disposed end of the first inner poppet 42. The spring keeper 50 may be an integral part of the first inner poppet 42. A spring 52 is disposed within the female portion 49 of the first outer poppet 40 and abuts the spring keeper 50 on the first inner poppet 42 to bias the first inner poppet 42 in the return pressure closed position. Said another way, the spring 52 is disposed within the female portion 49 of the first outer poppet 40 and between the spring keeper 50 and the valve chamber 24.

Further, the first outer poppet 40 includes a first small orifice 54 located in the first valve chamber 24. Said another way, the first small orifice 54 extends substantially perpendicular to the aperture 51 in the first outer poppet 40 and communicates diametrically through the aperture 51 and first outer poppet 40 within the cavity portion 39 of the first valve sleeve 37. In the return pressure position, the first inner poppet 42 overlaps the small orifice 54 preventing fluid flow. Further, the first valve sleeve 37 includes a large orifice 59 in fluid communication with the small orifice 54. The first large orifice 59 extends from the valve chamber 24 through the first valve sleeve 37 to the cavity portion 39 and is substantially perpendicular to the first valve sleeve 37. Orifice 59 allows flow from first cylinder port 28 through either the small orifice 54 or aperture 41. Hence, the first return flow passage contains either a large area passage via aperture 41 or a restricted flow passage via small orifice 54.

Similarly, the second check valve means 38 further includes a second outer poppet 56 disposed or housed within the cavity portion 45 of the second valve sleeve 43. The second outer poppet 56 includes a cylindrical shaped female portion 61 and an aperture 63 extending or diametrically communicating from the female portion 61 to the aperture 47 of the second valve sleeve 43. The aperture 63 is of a reduced diameter than the female portion 61. The second outer poppet 56 includes an outer frustoconical portion 65 which abuts a shoulder or seat 67 on the second valve sleeve 43 for a second cylinder port return pressure closed position. The check valve means 38 also includes a second inner poppet 58 slidably disposed in the aperture 63 of the second outer poppet 56. the second inner poppet 58 has a second shoulder 60 engaging an inner seat 69 in the second outer poppet 56 in the second cylinder port return pressure closed position.

The second inner poppet 58 includes a second pin 64 extending into the main bore 18 from the second shoulder 60 and a spring keeper 66 on the oppositely disposed end of the second inner poppet 58. The spring keeper 66 may be an integral part of the second inner poppet 58. A spring 70 is disposed within the female portion 61 of the second outer poppet 56 and abuts the spring keeper 66 on the second inner poppet 58 to bias the second inner poppet 58 in the return pressure closed position. Said another way, the spring 70 is disposed within the female portion 61 of the second outer poppet 56 and between the spring keeper 66 and the second valve chamber 26.

Further, the second outer poppet 56 includes a second small orifice 72 located in the second valve chamber 26. Said another way, the second small orifice 72 extends substantially perpendicular to the aperture 63 in the second outer poppet 56 and communicates diametrically through the aperture 63 and second outer poppet 56 within the cavity portion 45 of the second valve sleeve 43. In the return pressure closed position, the second inner poppet 58 overlaps the small orifice 72 preventing fluid flow. Further, the second valve sleeve 43 includes a large orifice 73 in fluid communication with the small orifice 72. The second large orifice 73 extends through the second valve sleeve 43 to the cavity portion 45 and is substantially perpendicular to the second valve sleeve 43. Orifice 73 allows flow from second cylinder port 30 through either the small orifice 72 or aperture 47. Thus, the first return flow passage comprises either a large area passage via aperture 47 or a restricted flow passage via small orifice 72.

The valve body 16 includes a spool valve means 74 slidably disposed in the main bore 18 for opening either of the first or second check valve means 36, 38 to allow fluid flow from the cylinder ports 28, 30 through the first and second check valve means 36, 38 and the inner passages 32, 34 to the pump ports 20, 22 respectively, to define a first return flow passage. In other words, the spool valve means 74 opens either the first check valve means 36 or the second check valve means 38 to allow fluid flow from the first cylinder port 28 through the first check valve means 36 and inner passage 32 to exit from the first pump port 20 to define a first return flow passage or to allow fluid flow from the second cylinder port 30 through the second check valve means 38 and inner passage 34 to exit from the second pump port 22 to also define a first return flow passage.

Hence, if fluid flow is through the first delivery flow passage of first valve chamber 24, the spool valve means 74 will move to open check valve means 38 for a first return flow passage. If fluid flow is through the second delivery flow passage of second valve chamber 26, the spool valve means 74 will move to open the first check valve means 36 for a first return flow passage. The spool valve means 74 is also used for opening the return ports 84, 86 to allow fluid flow to and from the tank passage 23 to and from the pump port 20, 22 through the return ports 84, 86 whereby the spool valve means 74 opens either of the first and second check valve means 36, 38 in response to a predetermined delivery pressure in the delivery flow passage in the opposite check valve chamber. Said another way, if fluid flow is through the first delivery flow passage of first valve chamber 24, the spool valve means 74 will move to open the return port 86 for a second return flow passage. If fluid flow is through the second delivery flow passage of second valve chamber 26, the spool valve means 74 will move to open the return port 84 for a second return flow passage. Hence, the spool valve means 74 opens either the first return port 84 or the secon return port 86 to allow fluid flow from the pump port 20 through the first return port 84 to the main bore 18 and to the tank passage 23 or from the tank passage 23 to the main bore 18 and through the first return port 84 to exit the pump port 20, or to allow fluid flow from the pump port 22 through the second return port 86 to the main bore 18 and to the tank passage 23 or from the tank passage 23 to the main bore 18 and through the second return port 86 to exit from the pump port 22 to define a second return flow passage.

The spool valve means 74 includes lands 76, 78 spaced so that either of the ports 84, 86 are opened when the spool 74 moves to open one of the check valve means 36, 38 respectively. Projections 80, 82 extend from oppositely disposed ends of the spool valve means 74 for engaging the first and second pins 48, 64 of the first and second inner poppets 42, 58. The valve body 16 further includes first and second end plugs 88 and 90 which are in sealing engagement with the valve body 16 in the respective opposite ends of the main bore 18.

In operation, and assuming a fluid flow to pump port 22 and out of pump port 20, oil will flow from the pump port 22 and through the second inner passage 34 to the area between the spool valve means 74 and the check valve means 38. The pressure of the oil against the check valve means 38 will cause the outer poppet 56 to engage the shoulder 60 of the inner poppet 58 causing the outer poppet 56 and inner poppet 58 to move simultaneously together and compress the spring 70 to allow fluid flow out through the large orifice 73 of the second valve sleeve 43 and through the cylinder port 30 to the cylinder 14. The pressure will also move the spool valve means 74 toward the opposite valve chamber 24 or check valve means 36. Contact between the spool valve means 74 and the first check valve means 36 first occurs as the projection 80 of the spool valve means 74 engages the pin 48 of the first inner poppet 42. At the point of contact, both lands 76, 78 on the spool valve means 74 are overlapped relative to return ports 84, 86. The return port 86 is connected to the pump port 22 so, in this example, sees delivery pressure. The return port 84 is connected to the pump port 20 and therefore, in this example, sees return pressure.

Assuming that an overruning load condition exists, the load will create pressure at cylinder port 28. This load pressure will aid the spring 52 in holding the first outer poppet 40 and first inner poppet 42 against their seats 55, 57, respectively. Once the delivery pressure overcomes the net force on the first inner poppet 42, the first inner poppet 42 will be lifted off the inner seat 57 by the spool valve means 74. Thus, the projection 80 of the spool valve means 74 will move the pin 48 of the first inner poppet 42 to move the shoulder 44 away from the inner seat 57 of the first outer poppet 40.

Since the first inner poppet 42 is a close fit in the aperture 51 of the first outer poppet 40, the first inner poppet 42 acts as a spool valve. In other words, no appreciable fluid flow can occur until the shoulder 44 on the first inner poppet 42 opens the small orifice 54 on the first outer poppet 40. This overlap is sized so that the land 76 on the spool valve means 74 opens the return port 84 prior or before the small orifice 54 of the first outer poppet 40 is opened by the shoulder 44 on the first inner poppet 42. Since the return port 84 is open to allow fluid flow to or from the tank passage 23 when the small orifice 54 is opened, the return flow has a first and second return flow path. Thus, most of the flow will pass through the first inner passage 32 and pump port 20 to the inlet side of the pump 12. Any excess flow can pass through the return port 84 to the tank passage 23. If makeup volume is required, it can be drawn from the tank passage 23 through the return port 84.

Once flow through the restricted flow passage of the small orifice 54 of the first outer poppet 40 occurs, the pressure behind the first outer poppet 40 will drop. If that pressure drops enough for the spool valve means 74 to overcome the seating force, i.e., so that the spool valve means 74 moves the first outer poppet 40 away from the shoulder 55 of the first valve sleeve 37, the outer poppet 40 will open to produce a much larger return flow area through aperture 41. In cases where no overrunning load condition exists, the outer poppet 40 will be opened immediately following inner poppet 42 by the spool valve means 74. Said another way, the inner poppet (42, 58) opens a restricted flow passage via the small orifice (54, 72) in the first return flow passage before the spool valve (74) opens a large area passage via apertures (41, 47) in the first return flow passage by opening outer poppets (40, 56). The spacing of the ports (84, 86) also allows the spool valve 74 to open the second return flow passage via return ports (84, 86) while opening the restricted flow passage via inner poppet (42, 58) and small orifices (54, 72) but before opening the large area passage via ports (41, 47) by opening outer poppets (40, 56).

When delivery fluid flow from the pump 12 ceases which causes the pressure on the spool valve means 74 to be released, the spring 52 will move the spool valve means 74 back towards the center position. The first outer poppet 40 is then free to return to its seat 55. The spring 52 will continue to move the first inner poppet 42, even after the outer poppet 40 reaches its seat 55, until the first inner poppet 42 reaches its seat 57. This movement will be aided once the small orifice 54 is closed off by any return pressure in the cylinder port 28. The spool valve means 74 will be moved further toward its center position by the first inner poppet 42 then it could have been moved by the first outer poppet 40 alone. This additional movement creates the overlap between the land 76 on the spool valve means 74 and the return port 84. Hence, the overlap on ports 84, 86 is created from either return direction. This overlap prevents leakage to the tank passage 23 from either delivery side of the pump 12 so that delivery pressure can be created immediately to shift the spool valve means 74 in the corrected direction. The operation of the assembly 10 is the same for fluid flow to pump port 20 from the pump 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A hydraulic lock valve assembly (10) of the type used in hydraulic marine steering systems, said assembly (10) comprising; a valve body (16) having an axially extending main bore (18), first and second axially spaced pump ports (20, 22) in fluid communciation with said main bore (18), a tank passage (23) in communication with said main bore (18), first and second valve chambers (24, 26) disposed at opposite ends of said main bore (18), a first cylinder port (28) in fluid communication with said first valve chamber (24), a second cylinder port (30) in fluid communication with said second valve chamber (26), a first inner passage (32) extending between said first pump port (20) and said first valve chamber (24), a second inner passage (34) extending between said second pump port (22) and said second valve chamber (26), first check valve means (36) disposed in said first valve chamber (24) for opening in response to a predetermined pressure in said first pump port (20) for allowing fluid flow out through said first cylinder port (28) to define first delivery flow passage, second check valve means (38) disposed in said second valve chamber (26) for opening in response to a predetermined pressure in said second pump port (22) for allowing fluid flow out through said second cylinder port (30) to define a second delivery flow passage, a first return port (84) interconnecting said pump port (20) and said main bore (18), a second return port (86) interconnecting said pump port (22) and said main bore (18), said assembly (10) characterized by spool valve means (74) slidably disposed in said main bore (18) for opening either of said first and second check valve means (36, 38) to allow fluid flow from said cylinder ports (28, 30) through said check valve means (36, 38) and said inner passage (32, 34) to said pump ports (20, 22) to define a first return flow passage and for opening either of said return ports (84, 86) to allow fluid flow to and from said tank passage (23) to and from said pump port (20, 22) through said return port (84, 86) to define a second return flow passage, whereby said spool valve means (74) opens either of said first and second check valve means (36, 38) in response to a predetermined delivery pressure in said delivery flow passage in the opposite check valve chamber, and said check valve means (36, 38) including an outer poppet (40, 56) and an inner poppet (42, 58) slidably disposed within said outer poppet (40, 56) to delay return flow through said first return flow passage to allow said spool valve means (74) to open said second return flow passage prior to said inner poppet (42, 58) opening said first return flow passage.

2. An assembly as set forth in claim 1 further characterized by said outer poppet (40, 56) including a small orifice (54, 72) located in said valve chamber (24, 26) and in fluid communication with said cylinder port (28, 30) and defining a restricted flow passage in said first return flow passage.

3. An assembly as set forth in claim 2 further characterized by said inner poppet (42, 56) having a shoulder (44, 60) to prevent fluid flow in said restricted flow passage of said first return flow passage until said shoulder (44, 60) opens said small orifice (54, 72) of said outer poppet (40, 56).

4. An assembly as set forth in claim 3 further characterized by said spool valve means (74) including spaced lands (76, 78) being spaced to open said return ports (84, 86) prior to said shoulder (44, 60) of said inner poppet (42, 56) opening said small orifice (54, 72) of said outer poppet (40, 56).

5. An assembly as set forth in claim 4 further characterized by said spool valve means (74) including a groove between said lands (76, 78) to allow fluid flow between said return ports (84, 86) and said tank passage (23).

6. An assembly as set forth in claim 5 further characterized by said check valve means (36, 38) including a valve sleeve (37, 43) disposed within said valve chamber (24, 26) and having a cavity portion (39, 45).

7. An assembly as set forth in claim 6 further characterized by said outer poppet (40, 56) being disposed within said cavity portion (39, 45) of said valve sleeve (37, 43) and including a frustoconical portion (53, 65) engaging a seat (55, 67) of said valve sleeve (37, 43).

8. An assembly as set forth in claim 7 further characterized by said outer poppet (40, 56) including an inner seat (57, 69) engaging said shoulder (44, 60) of said inner poppet (42, 58) to move said outer poppet (40, 56) and said inner poppet (42, 58) together simultaneously in response to the presence of delivery fluid flow pressure.

9. An assembly as set forth in claim 8 further characterized by a spring (52, 70) housed within said valve chamber (24, 26) and biased against said inner poppet (42, 58).

10. An assembly as set forth in claim 9 further characterized by said valve sleeve (37, 43) including a large orifice (59, 73) located in said valve chamber (24, 26) and in fluid communication with said small cylinder port (28, 30) and with orifice (54, 72) of said outer poppet (40, 56).

11. An assembly as set forth in claim 10 further characterized by said valve sleeve (37, 43) including an aperture (41, 47) defining a large area passage in said first return flow passage, said restricted flow passage being opened prior to said large area passage being opened.

12. An assembly as set forth in claim 11 further characterized by said inner poppet (42, 58) including a spring keeper (50, 66), said spring (52, 70) being disposed between said spring keeper (50, 66) and said valve chamber (24, 26).

13. An assembly as set forth in claim 12 further characterized by end plugs (88, 90) in sealing engagement with said valve body (16) at the respective opposite ends of said main bore (18).

* * * * *